M. D. Wilder,
Cattle Pump,
N° 63,972. Patented Apr. 16, 1867.
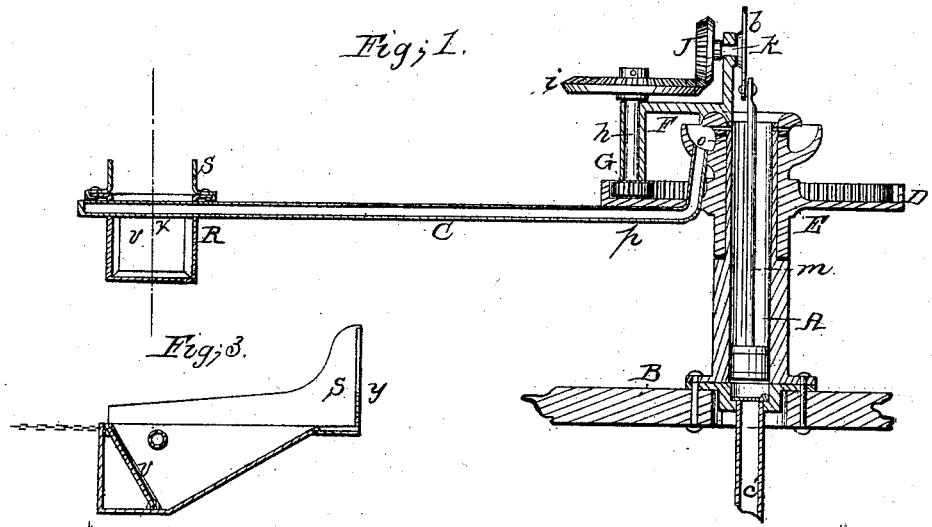
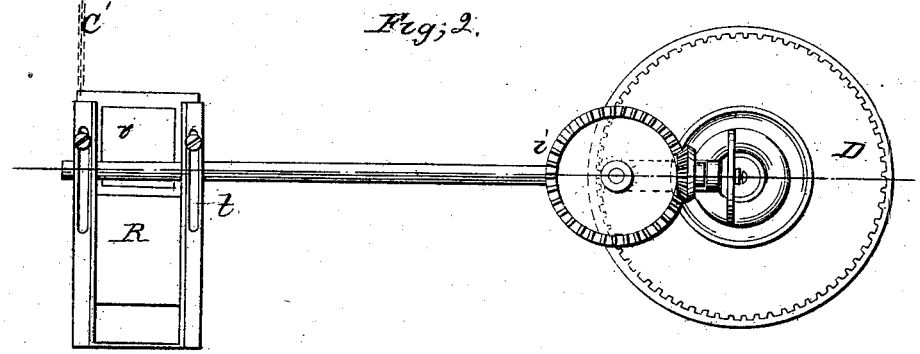
Witnesses:
Theo Tische
J. A. Service
Inventor:
M. D. Wilder
Per Munn & Co.
Attorneys M. D. Wilder, Cattle Pump, No. 63,972. Patented Apr. 16, 1867.

Witnesses:
Theo Tusche
J. A. Service

Inventor:
M. D. Wilder
Per Munn & Co.
Attorneys

M. D. Wilder,
Cattle Pump,
N° 63,972. Patented Apr. 16, 1867.
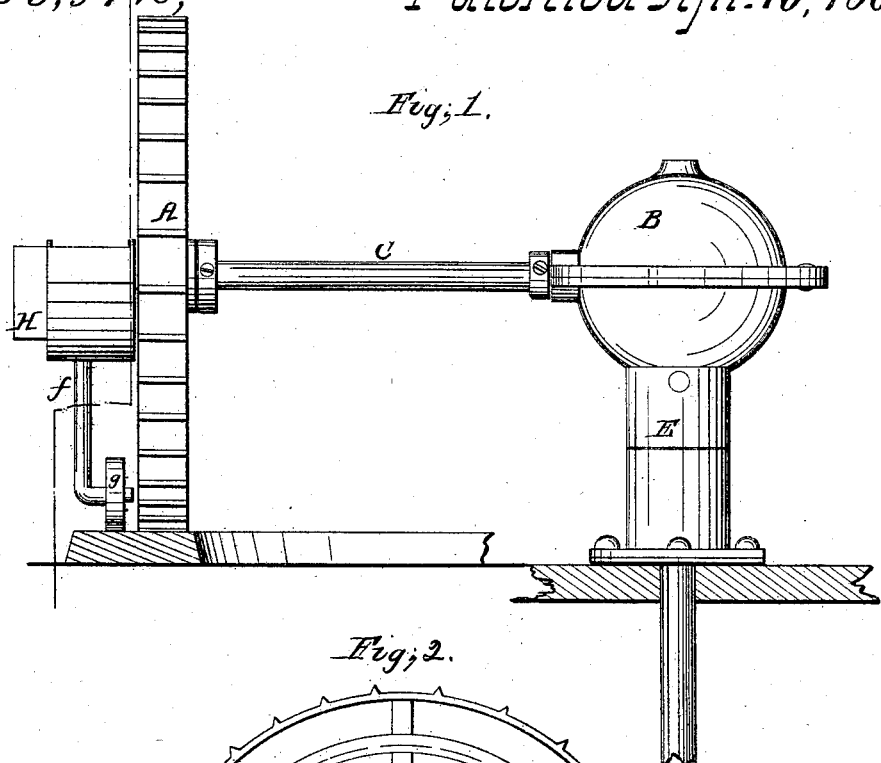
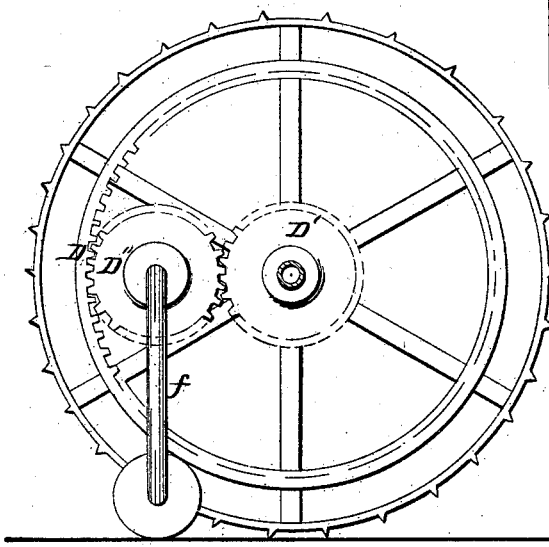

United States Patent Office.

MILO D. WILDER, OF LAPORTE, INDIANA.

Letters Patent No. 63,972, dated April 16, 1867.

IMPROVEMENT IN CATTLE PUMPS.

*The Schedule referred to in these Letters Patent and making part of the same.*

TO ALL WHOM IT MAY CONCERN:

Be it known that I, MILO D. WILDER, of Laporte, in the county of Laporte, and State of Indiana, have invented a new and useful Improvement in Cattle Pump; and I do hereby declare that the following is a full, clear, and exact description thereof, which will enable others skilled in the art to make and use the same, reference being had to the accompanying drawings, forming part of this specification.

This invention relates more particularly to a class of pumps designed for fields where cattle and other stock are kept, whereby cattle and horses may be made to pump the water which they drink from wells; and the invention consists in operating the pump by gearing, which is put in motion by means of a lever, which lever is connected with the barrel of the pump, and is itself a hollow tube or water conductor, as will hereinafter be described.

Sheet I, Figure 1, is a central vertical section of the whole apparatus.

Figure 3 is a vertical section of the drinking trough.

Figure 1:
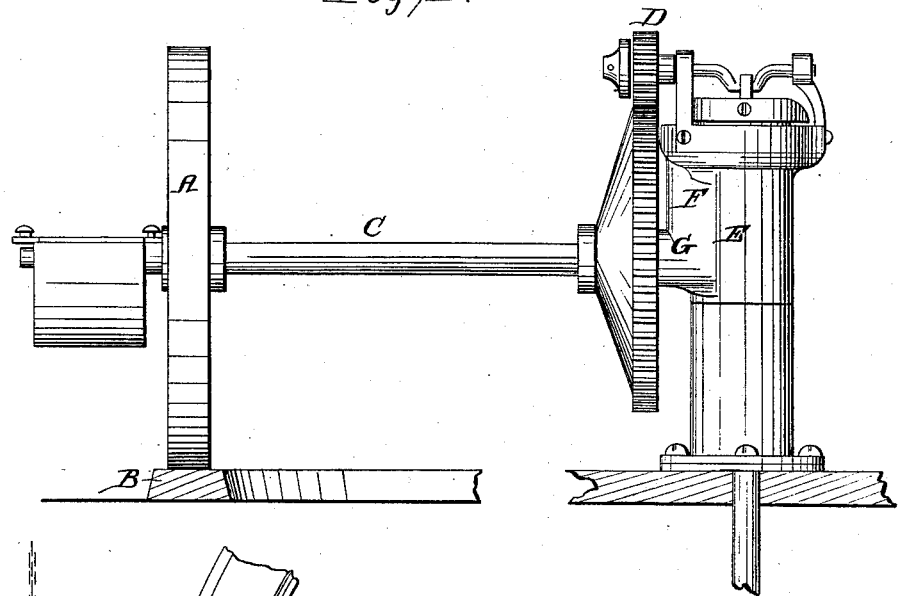

Sheet II, Figure 1, is a modification of the same device, the gearing being varied in form and the lever being supported by a wheel.

Figure 2:
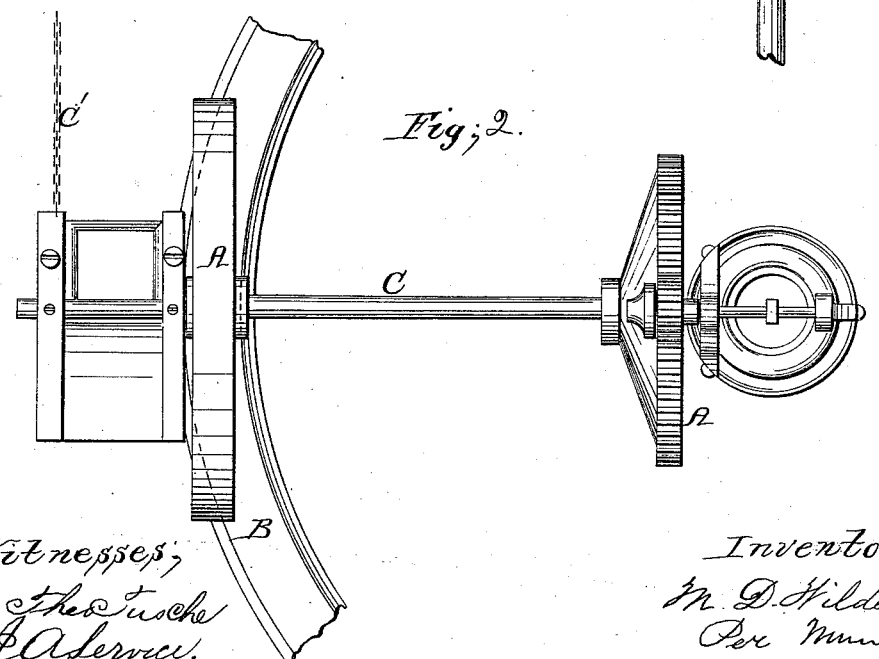
Figure 2 is a top or plan view.

Figure 2, same sheet, is a top or plan view.

Sheet III, Figure 1, is still another modification, the gearing being attached to a traction-wheel on the outer end of the lever.

Figure 2 is a vertical section showing the traction-wheel and the gearing.

Similar letters of reference indicate like parts.

A represents the pump attached to a platform, B. C' is the pipe leading into the well. D is a horizontal internal gear-wheel attached to the portion E of the pump barrel. This portion E revolves on the barrel proper, A, of the pump. F is a stand attached to the upper part of E, by which the other portion of the gearing is supported. G is a pinion which works in the internal gear or main wheel D. This pinion is attached to the bottom of a shaft, $h$, which is supported by the stand F. Upon the top of this shaft there is a bevel gear, $i$, which works in another bevel gear, J. This gear J is attached to a short horizontal shaft, $k$, which is also supported by the stand F. Upon the other end of the shaft $k$ there is a disk or crank-wheel, $l$, to which the piston-rod of the pump $m$ is attached by a wrist-pin. C is the lever by which the gearing is propelled and the pump operated. The lever extends through the wheel D and enters the barrel of the pump at $o$. It is firmly attached to the under side of the wheel by a band, $p$. This lever is a hollow tube. R is the drinking trough. It is rigidly attached to the outer end of the lever C. The lever passes entirely through it. Around the top of this trough there is an adjustable flange or collar, S, which is made to slide forward or back, being held in any desired position by screws or bolts which are attached to the trough, and which pass through slots in the collar, as seen in fig. 2, at $t$. In the back part of the trough, represented in the drawing by $v$, there is a glass with a chamber behind it, as seen in fig. 3. This chamber contains alcohol for winter use, and water for summer or for weather when water will not freeze. This glass and transparent liquid (water or alcohol) are for a decoy. When the animal puts his head in the trough and sees water beyond the glass and out of his reach, he will press forward to get it, and in that way he will put the pump in motion. When the water rises in the pump barrel to the end of the hollow lever C, at $o$, it will enter the lever and be discharged into the trough through a hole in the lever seen at X. The front of the collar S is cut away, it being something in the shape or form of an ox-bow, the lower portion of the bow being at $y$. In the modification shown on Sheet II the hollow lever is supported by a traverse-wheel, A, which rolls on a track, B. The pump in this case is driven by spur gearing, and the driving-gear wheel D is attached to a tube, through which the hollow lever C passes. The pinion D' is supported by stands on the top of the revolving portion or cylinder E, the pinion-shaft being a crank-shaft, to which the pump piston is attached. The lever communicates with the barrel of the pump through a recess, F, into which the water flows. This recess forms an angle, the bearing of the hollow shaft being in the horizontal portion marked G. The modification shown on Sheet III is the same as regards the essential features of the pump. The hollow lever C in this case is supported by a traction-wheel, A, within which is an internal gear-wheel, D, which drives a pinion, D', through an intermediate or loose wheel, D''. The pinion D' is attached to the lever C, while the traction-wheel A and the internal gear D revolve around the lever. The loose wheel D'' is supported by a bent rod, $f$, attached to the trough. The upper end forms a pivot for the wheel, and the lower end a pivot for a friction-roller, $g$. The pump in this case is operated by a crank upon the end of the hollow lever. The top of the pump is covered with a spherical cap, marked B, which with the upper part of the revolving piece E forms a globe or sphere. The outer end of the lever passes through the trough and revolves in a sleeve, the sleeve being attached to the trough, the end of the lever being secured by a washer, which is seen in dotted lines in a chamber on the side of the trough at H. In the modification shown on Sheet II the lever passes through a sleeve or tube which extends from the trough into the gear-wheel D, and which revolves with the gear-wheel and the traverse-wheel upon it. Chains C' are attached to the troughs for the purpose of attaching a horse to drive the pump, thus making them horse-power pumps when desired.

Having thus described my invention, what I claim as new, and desire to secure by Letters Patent, is—

The tubular driving-lever C, in combination with a pump and a trough, which pump is operated by gearing substantially in the manner herein shown and described.

MILO D. WILDER.

Witnesses:
HARVEY BROWN,
HENRY C. BROWN.